United States Patent
Kolev et al.

(10) Patent No.: US 6,188,885 B1
(45) Date of Patent: Feb. 13, 2001

(54) COMMUNICATIONS SYSTEMS FOR TRANSMITTING HIGH POWER VOICE MAIL NOTIFICATIONS AND RELATED METHODS AND USER TERMINALS

(75) Inventors: Javor Kolev; Torbjorn Solve, both of Cary, NC (US)

(73) Assignee: Ericsson Inc., Research Traingle Park, NC (US)

( * ) Notice: Under 35 U.S.C. 154(b), the term of this patent shall be extended for 0 days.

(21) Appl. No.: 09/039,805

(22) Filed: Mar. 16, 1998

(51) Int. Cl.[7] .............................. H04M 11/00; H04Q 7/20; H04B 1/00; H04B 7/185; H04L 27/00

(52) U.S. Cl. ...................... 455/413; 455/403; 455/414; 455/427; 455/430; 455/433; 375/272

(58) Field of Search .............................. 45/414–415, 417, 45/422, 458, 466, 522, 550, 413, 403, 412, 31.3, 427, 430

(56) References Cited

U.S. PATENT DOCUMENTS

| | | | |
|---|---|---|---|
| 4,903,262 | * 2/1990 | Dissoswat et al. | 370/95.2 |
| 5,175,866 | * 12/1992 | Childress et al. | 455/8 |
| 5,265,093 | * 11/1993 | Dissosway et al. | 370/85.11 |
| 5,481,610 | * 1/1996 | Doiron et al. | 380/21 |
| 5,485,635 | * 1/1996 | Paavonen | 455/54.1 |
| 5,574,788 | * 11/1996 | Childress et al. | 380/9 |
| 5,815,506 | * 9/1998 | Gokhale | 370/524 |
| 5,884,170 | * 3/1999 | Valentine et al. | 455/433 |
| 5,933,763 | * 8/1999 | Wang et al. | 455/31.3 |
| 5,974,092 | * 10/1999 | Roos et al. | 375/272 |
| 5,999,526 | * 12/1999 | Harland et al. | 370/352 |

OTHER PUBLICATIONS

Draft, Digital cellular telecommunications system (Phase 2+); Alphabets and language–specific information (GSM 03.38 version 5.6.0), *European Telecommunication Standard*, 3 pages (3rd Ed., Aug. 1997).

* cited by examiner

*Primary Examiner*—Daniel S. Hunter
*Assistant Examiner*—Meless Zewdu
(74) *Attorney, Agent, or Firm*—Myers Bigel Sibley & Sajovec

(57) ABSTRACT

A user terminal provides communications to and from a radiotelephone communications system. This radiotelephone communications system supports communications with the user terminal at a first power level and paging to the user terminal at a second power level greater than the first power level. In addition, a page includes an indication when voice mail has been received at the radiotelephone communications system. In particular, the user terminal includes a transceiver, a processor, and a user interface. The transceiver receives communications from the radiotelephone communications system at the first power level, transmits communications to the radiotelephone communications system, and receives pages from the radiotelephone communications system at the second power level. The processor processes the pages to determine when voice mail for the radiotelephone has been received at the radiotelephone communications system, and the user interface provides an indication to a user when voice mail for the user terminal has been received at the radiotelephone communications system. Related methods and communications systems are also discussed.

46 Claims, 3 Drawing Sheets

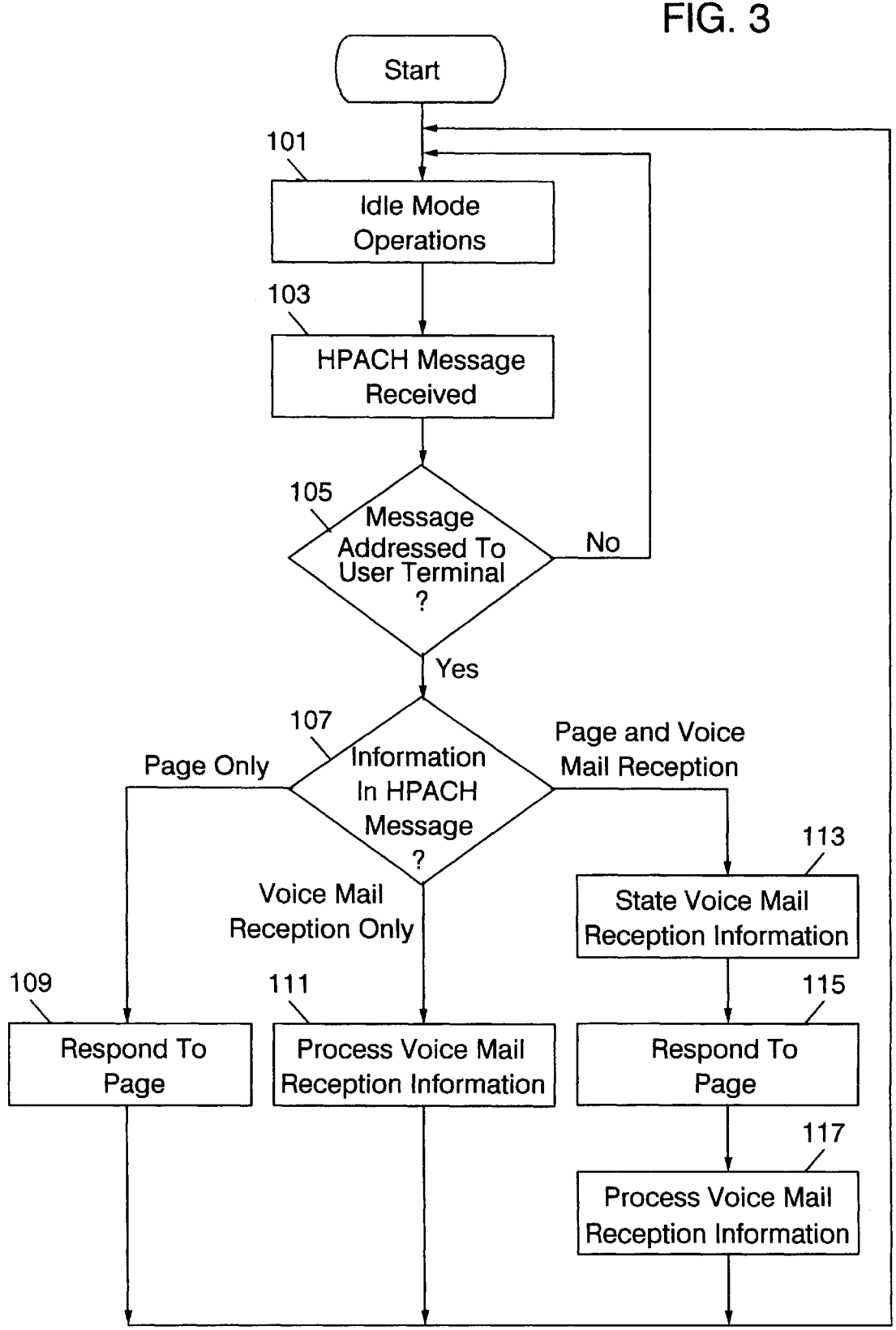

COMMUNICATIONS SYSTEMS FOR TRANSMITTING HIGH POWER VOICE MAIL NOTIFICATIONS AND RELATED METHODS AND USER TERMINALS

FIELD OF THE INVENTION

The present invention relates to the field of radiotelephone communications and more particularly to voice mail notifications for radiotelephone communications.

BACKGROUND OF THE INVENTION

In a conventional mobile radiotelephone communications system, communications are provided between one or more mobile user terminals, a wired communications system, and the radiotelephone communications system. In other words, a radio link between a mobile user terminal and the radiotelephone communications system can be used to support communications between the mobile user terminal and a second mobile user terminal, or between the mobile user terminal and a telephone on the wired communications system.

When a call is placed to the mobile user terminal, the radiotelephone communications system sends an incoming call message to the mobile user terminal over a control channel indicating the presence of an incoming call. Upon reception of this incoming call message over the control channel, the user terminal and the radiotelephone communications system initiate a series of control communications to establish a link therebetween over a dedicated channel. If the user terminal is unavailable to receive the initial incoming call message, however, the telephone call may not be established.

Accordingly, a cellular radiotelephone communications system, such as the terrestrial Global System For Mobile Communications (GSM 03.38), may provide a voice mail feature allowing the calling party to leave a voice mail message for the user terminal if the telephone call is not established. In addition, GSM systems may provide a message to the user terminal indicating that voice mail has been received thereby alerting the user terminal to the presence of the voice mail so that the user can check the voice mail in a timely manner. In particular, the voice mail indicator message can be transmitted in a GSM system as a part of a Short Message Service (SMS) message.

Not all radiotelephone communications systems, however, support SMS messages. Furthermore, if the user terminal is unable to establish communications responsive to the initial incoming message (page), it may also be unable to receive the SMS message including the voice mail indicator.

SUMMARY OF THE INVENTION

It is therefore an object of the present invention to provide improved methods of notifying a mobile user terminal that voice mail for the mobile user terminal has been received at the communications systems, and related systems and terminals.

This and other objects are provided according to the present invention by methods of transmitting a voice mail reception page at a power level greater than that used for other communications. Accordingly, the voice mail reception page may be received at the user terminal even if two way communications cannot be established. The use of a higher power voice mail reception page may be particularly advantageous in a satellite radiotelephone communications system where an inability to establish two way communications may occur with a greater frequency than in a terrestrial communications system.

In particular, a method according to the present invention is provided for notifying a user terminal that voice mail has been received for the user terminal at a radiotelephone communications system wherein the radiotelephone communications system supports communications with the user terminal at a first power level and pages to the user terminal at a second power level greater than the first power level. This method includes the steps of receiving voice mail for the user terminal at the radiotelephone communications system, and transmitting a page from the radiotelephone communications system at the second power level wherein the page includes an indication of voice mail reception at the radiotelephone communications system for the user terminal. This page is received at the user terminal, and this received page includes the indication of voice mail reception at the radiotelephone communications system for the user terminal.

More particularly, the radiotelephone communications system can be a satellite radiotelephone communications system so that the page is transmitted from a satellite of the satellite radiotelephone communications system. In addition, the page can be a high penetration page message transmitted over a high power alert channel.

The page can include a plurality of binary bits at least one of which indicates reception of voice mail. In addition, the page can include at least two binary voice mail indicator bits which are set to a first pattern to indicate reception of voice mail and which are set to a second pattern to indicate no reception of voice mail. Alternately, the page can include at least two binary voice mail indicator bits, wherein at least two binary voice mail indicator bits are set according to a first pattern to indicate no reception of voice mail, according to a second pattern to indicated reception of one voice mail message, and according to a third pattern to indicate reception of two voice mail messages. The method can also include providing indication of voice mail reception through a user interface of the user terminal.

According to an alternate aspect of the present invention, a user terminal provides communications to and from a radiotelephone communications system wherein the radiotelephone communications system supports communications with the user terminal at a first power level and paging to the user terminal at a second power level greater than the first power level. In particular, a page includes an indication when voice mail has been received at the radiotelephone communications system. This user terminal includes a transceiver, a processor, and a user interface. The transceiver receives communications from the radiotelephone communications system at the first power level, and transmits communications to the radiotelephone communications system. The transceiver also receives pages from the radiotelephone communications system at the second power level. The processor processes the pages to determine when voice mail for the radiotelephone has been received at the radiotelephone communications system, and the user interface provides an indication to a user when voice mail for the user terminal has been received at the radiotelephone communications system.

According to yet another aspect of the present invention, a radiotelephone communications system provides communications to and from at least one user terminal. This radiotelephone communications system includes a controller and a transceiver. In particular, the controller receives voice mail for a user terminal and the controller generates pages including voice mail reception indicators for transmission to the user terminal. The transceiver transmits communications to the user terminal at a first power level, transmits said pages generated by the controller and including the voice mail reception indicators to the user terminal at a second power level greater than said first power level, and receives communications from the user terminal.

The methods, user terminals, and communications systems of the present invention thus provide that voice mail information pages can be received by a user terminal even when two-way communications with the user terminal cannot be established.

BRIEF DESCRIPTION OF THE DRAWINGS

FIG. 3 is a flow chart illustrating operations of a user terminal according to the present invention.

DETAILED DESCRIPTION

Figure 1:
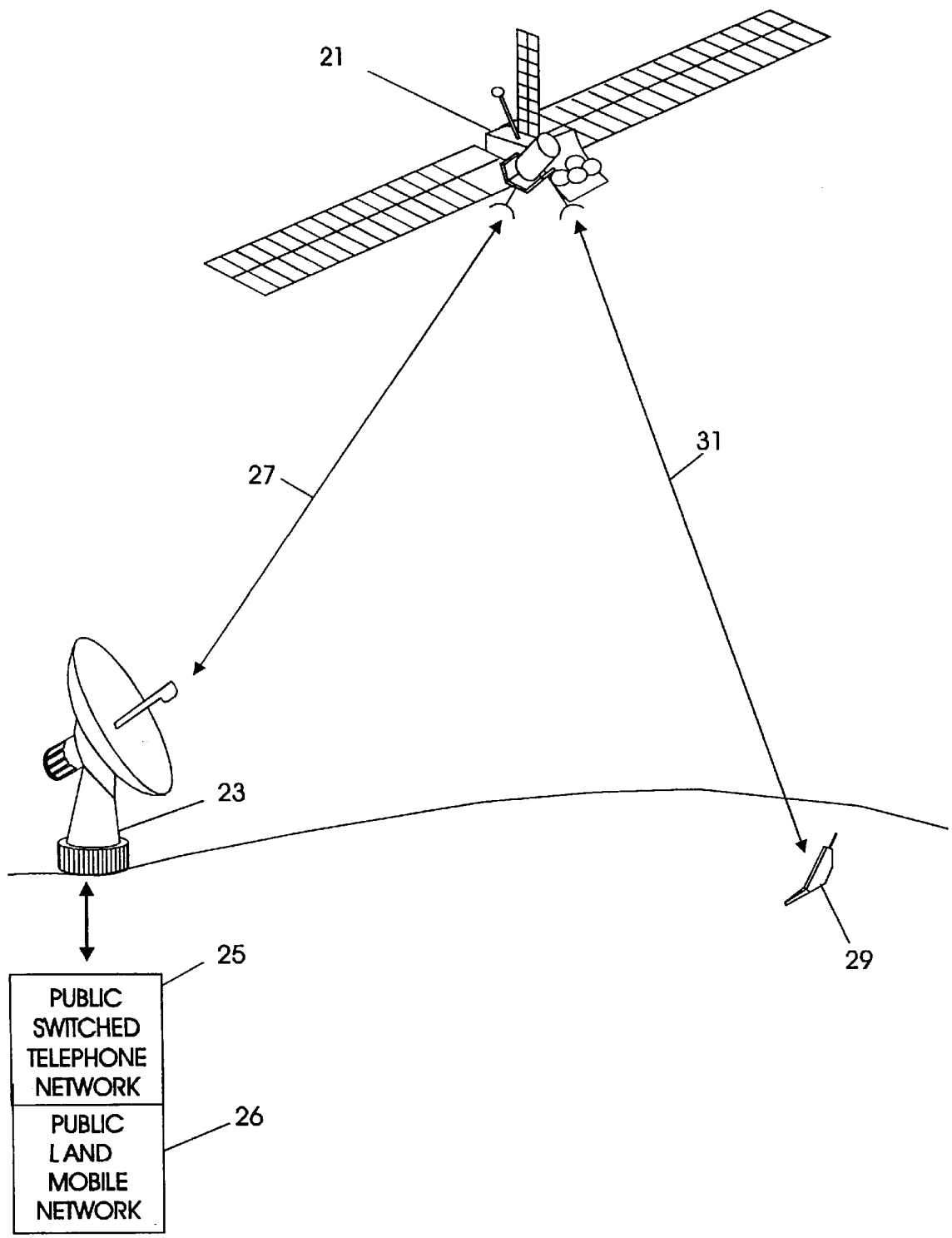
FIG. 1 illustrates a satellite communications system according to the present invention.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thicknesses of layers and regions are exaggerated for clarity. Like numbers refer to like elements throughout.

As shown in FIG. 1, a radiotelephone communications system can be implemented as a satellite communications system including at least one satellite 21 and a terrestrial controller 23 which can be coupled to a wireless communications system such as a Public Land Mobile Network (PLMN) 26, and/or to a wired communications system such as a Public Switched Telephone Network (PSTN) 25. The terrestrial controller 23 and the satellite 21 are coupled through radio links 27. The satellite 21 and at least one user terminal 29 are coupled through radio links 31.

As will be understood by those having skill in the art, the satellite communications system can provide communications to and from a plurality of user terminals, and the satellite can provide service through a plurality of spot beams (or cells) each covering a different geographic region. Moreover, the satellite communications system can include a plurality of satellites and/or a plurality of controllers. Accordingly, the satellite communications system can facilitate communications between the mobile user terminal 29 and another mobile user terminal, or between the mobile user terminal 29 and a telephone coupled to the public switched telephone network. In addition, the user terminal can be a radiotelephone, a portable computer, a personal digital assistant, or any other electronic device adapted for radiotelephone communications.

In a satellite radiotelephone communications system according to the present invention, the communications system may establish a radiotelephone communications link with the user terminal 29 using a traffic channel via a radio link 31. For example, such a link can be established responsive to a call placed by a telephone from the PSTN 25, or the link can be established responsive to a call from another user terminal coupled to the satellite 21 or coupled to another satellite in the communications system. The link is established by transmitting a call set up communication (page) from a transceiver of the satellite 21 wherein the call set up communication is transmitted at a first power level. The call set up communication may be transmitted over a control channel. Upon reception of the call set up communication, the user terminal 29 acknowledges receipt thereof and a two-way radiotelephone communications link is established over a dedicated channel such as a traffic channel.

If the user terminal does not receive the call set up communication or is unable to acknowledge receipt of the call set up communication, however, the radiotelephone communications link may not be established. In this event, a voice mail option is provided within the satellite radiotelephone communications system of the present invention wherein the calling party can leave a recorded voice mail message for the user terminal. For example, a voice mail storage and retrieval system can be provided within the terrestrial controller 23 of the communications system. Alternately, the voice mail storage and retrieval system can be provided within the satellite 21 or portions of the voice mail storage and retrieval system can be split between the satellite 21, the controller 23, and/or other satellites and/or controllers in the system. Accordingly, the user terminal 29 can later call the communications system to retrieve the voice mail message(s).

According to the present invention, a call set up communication is transmitted from the satellite 21 to the user terminal 29. If the communications system is unable to establish a radiotelephone communications link, the calling party is given the option to leave a voice mail message for the user terminal. If a voice mail message is left with the communications system (received by the communications system), the communications system transmits a voice mail reception page including an indication of voice mail reception to the user terminal wherein the voice mail reception page is transmitted at a power level greater than the nominal power level used for radiotelephone communications. Accordingly, the higher power voice mail reception page is more likely to be received by the user terminal.

In particular, the voice mail system of the present invention can be implemented in the Asia Cellular Satellite (ACeS) system wherein the voice mail reception page is transmitted as a High Power Alert Channel (HPACH) paging message wherein a previously unused portion of the HPACH paging message is used to transmit the voice mail reception information. The conventional use of HPACH paging messages is to provide indication of incoming calls to the user terminal. An HPACH paging message according to the ACeS system is 53 bits long and includes a 50 bit mobile identity number so that three bits are available for voice mail indication. As discussed in greater detail below, one or more of these three bits can be used to indicate the presence or absence of one or more voice mail messages for the user terminal.

The HPACH paging message is transmitted over a high penetration channel having a power higher than that used for ordinary communications channels. The HPACH paging message can thus reach the user terminal even under disadvantaged conditions for radio transmission and reception. The likelihood that the voice mail reception information is received by the user terminal can be increased even though the system is unable to establish the two-way radiotelephone communications link initially.

In other words, a call set up communication (page) can be transmitted from the satellite at the second (higher) power using an HPACH paging message transmitted over a high penetration channel. If communications with the user terminal cannot be established over a dedicated channel at the first (lower) power level, a voice mail message can be saved at the communications system. In general, this can be done if the user terminal is not reachable at the time of paging for any reason at all. Moreover, a voice mail reception page can then be transmitted from the satellite at the second (higher) power using a second HPACH paging message transmitted over the high penetration channel.

According to one aspect of the present invention, one of the three unused bits of the HPACH paging message can be used to transmit information relating to the reception of voice mail at the communications system. For example, the bit can be set to a logic "1" to indicate that one or more voice mail messages have been received at the communications system for the user terminal, and set to logic "0" to indicate that no voice mail messages have been received. The two remaining bits are thus available to transmit other paging information.

According to a second aspect of the present invention, a plurality of the unused bits can be used to transmit information relating to the reception of voice mail at the communications system to provide redundancy. For example, at least two of the bits can be set according to a first pattern to indicate reception of at least one voice mail message, and the at least two bits can be set according to a second pattern to indicate no reception of voice mail messages. More particularly, all three bits can be set to a logic "1" to indicate reception of at least one voice mail message, and all three bits can be set to a logic "0" to indicate no reception of voice mail messages. This redundancy can be used to reduce errors caused by poor signaling conditions. In other words, the redundancy can be used to provide error detection and/or correction.

According to a third aspect of the present invention, a plurality of the bits can be used to transmit information relating to the reception of voice mail at the communications system as well as how many voice mail messages have been received. For example, at least two bits can be set according to a first pattern to indicate no reception of voice mail, set according to a second pattern to indicate reception of one voice mail message, and set according to a third pattern to indicate reception of two or more voice mail messages. More particularly, two bits can be used to indicate reception of 0 to 3 voice mail messages, and three bits can be used to indicated reception of 0 to 7 voice mail messages.

The voice mail reception page is received at the user terminal 29 where the page can be processed and interpreted. Moreover, the voice mail reception page indicates the presence of voice mail for the user terminal, and this information can be provided through a user interface as discussed below.

Figure 2:
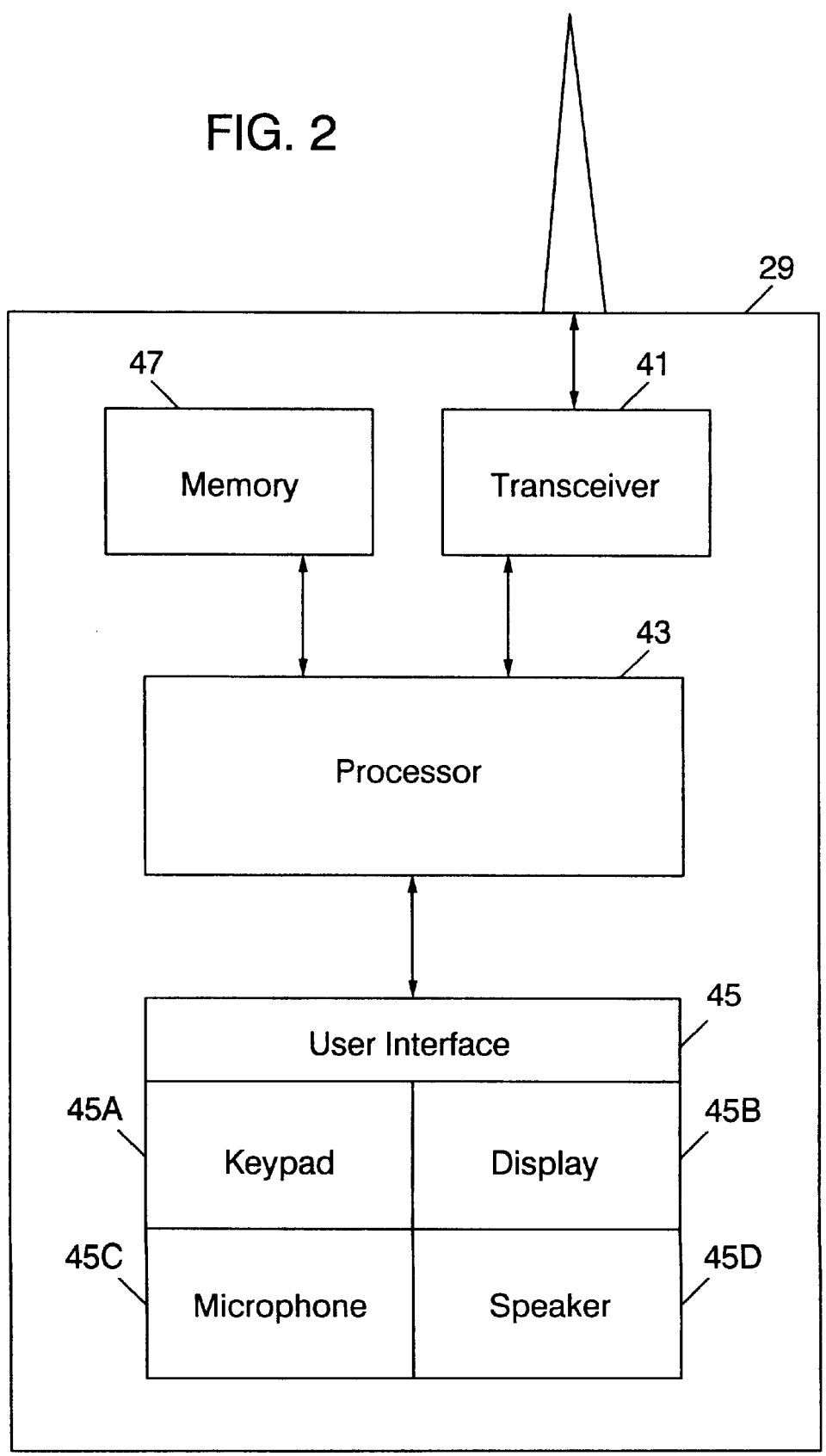
FIG. 2 is a block diagram of a mobile user terminal according to the present invention.

A block diagram of a user terminal 29 according to the present invention is illustrated in FIG. 2. As shown, the user terminal includes a transceiver 41 which receives communications from the communications system at the first power level and which transmits communications to the communications system as is known. The transceiver can also receive pages from the communications system at the second power level according to the present invention. Accordingly, the transceiver 41 can receive the voice mail reception page at the second power level, and more particularly, the user terminal can receive an HPACH paging message including the voice mail reception information at the second power level.

A processor 43 is coupled to the transceiver 41 so that the processor can process communications transmitted and received by the transceiver. More particularly, the processor can process the HPACH paging message including the voice mail reception information to determine if any voice mail messages have been received at the communications system. Moreover, the processor can determine a number of voice mail messages if this information is provided in the page.

A user interface 45 is coupled to the processor 43, and this user interface can include a keypad 45A; a visual display 45B including a liquid crystal display (LCD) and/or a light emitting diode (LED) display; a microphone 45C; and a speaker 45D. More particularly, the user interface 45 can provide notification to the user that voice mail has been received at the communications system. For example, notification can be provided audibly using the speaker 45D or other audio generating means, or visually using display 45B. Moreover, a number of voice mail messages can also be indicated, for example, as a number on an LCD, a number of lit LED's, a number of flashes of an LED, and/or a number of audible beeps.

The user terminal can also include a memory 47 coupled with the processor 43. The memory can be used to store the information relating to voice mail reception at the communication system. Accordingly, processing of the information relating to voice mail reception can be delayed until other tasks have been completed. For example, the page used to transmit the information relating to voice mail reception can also request some other action on the part of the radiotelephone. The information relating to voice mail can thus be stored and processed after the other action has been completed.

As will be appreciated by those of skill in the art, the above described aspects of the present invention in FIG. 2 may be provided by hardware, software, or a combination of the above. While various components of the apparatus of the present invention have been illustrated in part as discrete elements in the Figure, they may, in practice, be implemented by a microcontroller including input and output ports and running software code, by custom or hybrid chips, by discrete components or by a combination of the above. In particular, memory 47 and processor 43 may be implemented as a segment of existing memory and additional code executing on an existing processor of the user terminal respectively.

Operations of a user terminal according to one aspect of the present invention are illustrated in the flowchart of FIG. 3. At block 101 idle mode operations are performed until an HPACH message is received at block 103. The user terminal then reads the message address to determine if the message is intended for the user terminal at decision block 105. If the message is not intended for the user terminal, the user terminal resumes idle mode operations at block 101.

If the message is intended for the user terminal, the information in the HPACH message is read at decision block 107. If the HPACH message includes only non-voice mail paging information, the user terminal responds to the non-voice mail paging information at block 109 and then returns to idle mode operations at block 101. If the HPACH message includes only voice mail reception information, the user terminal processes the voice mail reception information at block 111 and returns to idle mode operations at block 101. If the HPACH message includes both non-voice mail paging information and voice mail reception information, the user terminal stores the voice mail reception information in memory at block 113, responds to the non-voice mail page at block 115, processes the voice mail reception information at block 117, and returns to idle mode operations at block 101.

The present invention has been described above with respect to FIG. 3 with reference to a flowchart illustrating operations of the present invention. It will be understood that each block of the flowchart, and combinations of blocks in the flowchart, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based systems which perform the specified functions or steps, or combinations of special purpose hardware and computer instructions.

In the drawings and specification, there have been disclosed typical preferred embodiments of the invention and, although specific terms are employed, they are used in a generic and descriptive sense only and not for purposes of limitation, the scope of the invention being set forth in the following claims. While the present invention has been discussed above with reference to a satellite radiotelephone communications system, the methods, systems, and terminals of the present invention can also be applied in a terrestrial cellular radiotelephone communications system. The methods, systems, and terminals of the present invention can also be applied with dual mode terminals capable of providing communications with both satellite radiotelephone communications systems and terrestrial radiotelephone communications systems.

What is claimed is:

1. A radiotelephone communications system for providing communications to and from at least one user terminal, said radiotelephone communications system comprising:
    a controller which receives voice mail for a user terminal wherein said controller generates a page including a voice mail reception indicator for transmission to the user terminal wherein the voice mail reception indicator provides indication of voice mail for the user terminal received at the radiotelephone communications system; and
    a transceiver coupled with said controller wherein said transceiver transmits communications to the user terminal at a first power level, transmits said page generated by said controller and including said voice mail reception indicator to the user terminal at a second power level greater than said first power level, and receives communications from the user terminal so that indication of voice mail for the user terminal is transmitted at the second power level.

2. A radiotelephone communications system according to claim 1 wherein the radiotelephone communications system comprises a satellite radiotelephone communications system and wherein said transceiver is provided on a satellite.

3. A radiotelephone communications system according to claim 2 wherein said controller is provided on earth and wherein said controller is coupled with said transceiver via radio transmission and reception.

4. A radiotelephone communications system according to claim 1 wherein the page at said second power level comprises a high penetration page message transmitted over a high power alert channel.

5. A radiotelephone communications system according to claim 1 wherein the page at said second power level comprises a plurality of bits at least one of which indicates reception of voice mail.

6. A radiotelephone communications system according to claim 1 wherein the page at said second power level comprises at least two binary voice mail indicator bits which are set to a first pattern to indicate reception of voice mail for the user terminal and which are set to a second pattern to indicate no reception of voice mail for the user terminal.

7. A radiotelephone communications system according to claim 1 wherein the page at said second power level comprises at least two voice mail indicator bits, wherein the at least two voice mail indicator bits are set according to a first pattern to indicate no reception of voice mail for the user terminal, according to a second pattern to indicated reception of one voice mail message for the user terminal, and according to a third pattern to indicate reception of two voice mail messages for the user terminal.

8. A method of notifying a user terminal that voice mail has been received for the user terminal at a radiotelephone communications system, said method comprising the steps of:
    transmitting radiotelephone communications from the radiotelephone communications system at a first power level;
    receiving voice mail for the user terminal at the radiotelephone communications system;
    transmitting a page from the radiotelephone communications system at a second power level greater than the first power level wherein the page includes an indication of voice mail reception at the radiotelephone communications system for the user terminal wherein the indication of voice mail reception provides indication of voice mail for the user terminal received at the radiotelephone communications system; and
    receiving the page at the second power level at the user terminal wherein the page includes said indication of voice mail reception at the radiotelephone communications system for the user terminal so that indication of voice mail for the user terminal is received at the second power level.

9. A method according to claim 8 wherein the radiotelephone communications system comprises a satellite radiotelephone communications system and wherein the page is transmitted from a satellite of the satellite radiotelephone communications system.

10. A method according to claim 8 wherein the page at the second power level comprises a high penetration page message transmitted over a high power alert channel.

11. A method according to claim 8 wherein the page at the second power level comprises a plurality of bits at least one of which indicates reception of voice mail.

12. A method according to claim 8 wherein the page at the second power level comprises at least two voice mail indicator bits which are set to a first pattern to indicate reception of voice mail and which are set to a second pattern to indicate no reception of voice mail.

13. A method according to claim 8 wherein the page at the second power level comprises at least two voice mail indicator bits, wherein the at least two voice mail indicator bits are set according to a first pattern to indicate no reception of voice mail, according to a second pattern to indicated reception of one voice mail message, and according to a third pattern to indicate reception of two voice mail messages.

14. A method according to claim 8 further comprising the step of:
providing indication of voice mail reception through a user interface of the user terminal.

15. A user terminal for providing communications to and from a radiotelephone communications system, said user terminal comprising:
a transceiver which receives communications from the radiotelephone communications system at a first power level, which transmits communications to the radiotelephone communications system, and which receives pages from the radiotelephone communications system at a second power level greater than the first power level wherein each of said pages includes an indication when voice mail has been received at the radiotelephone communications system so that said indication that voice mail has been received provides indication of voice mail for the user terminal received at the radiotelephone communications system;
a processor coupled to said transceiver wherein said processor processes said pages received at the second power level to determine when voice mail for the radiotelephone has been received at the radiotelephone communications system; and
a user interface coupled to said processor wherein said user interface provides an indication to a user when voice mail for the user terminal has been received at the radiotelephone communications system.

16. A user terminal according to claim 15 wherein the radiotelephone communications system comprises a satellite radiotelephone communications system and wherein the pages are transmitted from a satellite of the satellite radiotelephone communications system.

17. A user terminal according to claim 15 wherein the pages each comprise a high penetration page message transmitted over a high power alert channel.

18. A user terminal according to claim 15 wherein the pages received at the second power level each comprise a plurality of bits at least one of which indicates reception of voice mail at the radiotelephone communications system for the user terminal.

19. A user terminal according to claim 15 wherein the pages received at the second power level each comprise at least two voice mail indicator bits which are set to a first pattern to indicate reception of voice mail at the radiotelephone communications system for the user terminal and which are set to a second pattern to indicate no reception of voice mail at the radiotelephone communications system for the user terminal.

20. A user terminal according to claim 15 wherein the pages received at the second power level each comprise at least two voice mail indicator bits, wherein the at least two voice mail indicator bits are set according to a first pattern to indicate no reception of voice mail for the user terminal, according to a second pattern to indicate reception of one voice mail message for the user terminal, and according to a third pattern to indicate reception of two voice mail messages for the user terminal.

21. A method for providing communications to and from at least one user terminal, said method comprising:
receiving voice mail for a user terminal at a radiotelephone communication system;
generating a page including a voice mail reception indicator for transmission to the user terminal wherein the voice mail reception indicator provides indication that voice mail for the user terminal has been received at the radiotelephone communications system;
transmitting communications to the user terminal at a first power level;
receiving communications from the user terminal; and
transmitting said page including said voice mail reception indicator to the user terminal at a second power level greater than said first power level so that indication of voice mail for the user terminal is transmitted at the second power level.

22. A method according to claim 21 wherein the radiotelephone communications system comprises a satellite radiotelephone communications system and wherein said page is transmitted from a satellite to the user terminal.

23. A method according to claim 21 wherein the page at said second power level comprises a high penetration page message transmitted over a high power alert channel.

24. A method according to claim 21 wherein the page at said second power level comprises a plurality of bits at least one of which indicates reception of voice mail.

25. A method according to claim 21 wherein the page at said second power level comprises at least two binary voice mail indicator bits which are set to a first pattern to indicate reception of voice mail for the user terminal and which are set to a second pattern to indicate no reception of voice mail for the user terminal.

26. A method according to claim 21 wherein the page at said second power level comprises at least two voice mail indicator bits, wherein the at least two voice mail indicator bits are set according to a first pattern to indicate no reception of voice mail for the user terminal, according to a second pattern to indicated reception of one voice mail message for the user terminal, and according to a third pattern to indicate reception of two voice mail messages for the user terminal.

27. A radiotelephone communications system for providing communications to and from at least one user terminal, said method comprising:
means for receiving voice mail for a user terminal at a radiotelephone communication system;
means for generating a page including a voice mail reception indicator for transmission to the user terminal wherein the voice mail reception indicator provides indication that voice mail for the user terminal has been received at the radiotelephone communications system;
means for transmitting communications to the user terminal at a first power level;
means for receiving communications from the user terminal; and
means for transmitting said page including said voice mail reception indicator to the user terminal at a second power level greater than said first power level so that indication of voice mail for the user terminal is transmitted at the second power level.

28. A radiotelephone communications system according to claim 27 wherein the radiotelephone communications system comprises a satellite radiotelephone communications system and wherein said means for transmitting is provided on the satellite.

29. A radiotelephone communications system according to claim 27 wherein the page at said second power level comprises a high penetration page message transmitted over a high power alert channel.

30. A radiotelephone communications system according to claim 27 wherein the page at said second power level comprises a plurality of bits at least one of which indicates reception of voice mail.

31. A radiotelephone communications system according to claim 27 wherein the page at said second power level comprises at least two binary voice mail indicator bits which are set to a first pattern to indicate reception of voice mail for the user terminal and which are set to a second pattern to indicate no reception of voice mail for the user terminal.

32. A radiotelephone communications system according to claim 27 wherein the page at said second power level comprises at least two voice mail indicator bits, wherein the at least two voice mail indicator bits are set according to a first pattern to indicate no reception of voice mail for the user terminal, according to a second pattern to indicated reception of one voice mail message for the user terminal, and according to a third pattern to indicate reception of two voice mail messages for the user terminal.

33. A method for providing communications to and from a radiotelephone communications system, said method comprising:

receiving communications from the radiotelephone communications system at a first power level;

transmitting communications to the radiotelephone communications system;

receiving a page from the radiotelephone communications system at a second power level greater than the first power level wherein said page includes an indication when voice mail has been received at the radiotelephone communications system so that said indication that voice mail has been received provides indication of voice mail for the user terminal received at the radiotelephone communications system;

processing said page received at the second power level to determine when voice mail for the radiotelephone has been received at the radiotelephone communications system; and providing an indication to a user when voice mail for the user terminal has been received at the radiotelephone communications system.

34. A method according to claim 33 wherein the radiotelephone communications system comprises a satellite radiotelephone communications system and wherein the pages are received from a satellite of the satellite radiotelephone communications system.

35. A method according to claim 33 wherein the page comprises a high penetration page message transmitted over a high power alert channel.

36. A method according to claim 33 wherein the page received at the second power level comprises a plurality of bits at least one of which indicates reception of voice mail at the radiotelephone communications system for the user terminal.

37. A method according to claim 33 wherein the page received at the second power level comprises at least two voice mail indicator bits which are set to a first pattern to indicate reception of voice mail at the radiotelephone communications system for the user terminal and which are set to a second pattern to indicate no reception of voice mail at the radiotelephone communications system for the user terminal.

38. A method according to claim 33 wherein the pages received at the second power level each comprise at least two voice mail indicator bits, wherein the at least two voice mail indicator bits are set according to a first pattern to indicate no reception of voice mail for the user terminal, according to a second pattern to indicate reception of one voice mail message for the user terminal, and according to a third pattern to indicate reception of two voice mail messages for the user terminal.

39. A user terminal for providing communications to and from a radiotelephone communications system, said method comprising:

means for receiving communications from the radiotelephone communications system at a first power level;

means for transmitting communications to the radiotelephone communications system;

means for receiving a page from the radiotelephone communications system at a second power level greater than the first power level wherein said page includes an indication when voice mail has been received at the radiotelephone communications system so that said indication that voice mail has been received provides indication of voice mail for the user terminal received at the radiotelephone communications system;

means for processing said page received at the second power level to determine when voice mail for the radiotelephone has been received at the radiotelephone communications system; and means for providing an indication to a user when voice mail for the user terminal has been received at the radiotelephone communications system.

40. A user terminal according to claim 39 wherein the radiotelephone communications system comprises a satellite radiotelephone communications system and wherein the pages are received from a satellite of the satellite radiotelephone communications system.

41. A user terminal according to claim 39 wherein the page comprises a high penetration page message transmitted over a high power alert channel.

42. A user terminal according to claim 39 wherein the page received at the second power level comprises a plurality of bits at least one of which indicates reception of voice mail at the radiotelephone communications system for the user terminal.

43. A user terminal according to claim 39 wherein the page received at the second power level comprises at least two voice mail indicator bits which are set to a first pattern to indicate reception of voice mail at the radiotelephone communications system for the user terminal and which are set to a second pattern to indicate no reception of voice mail at the radiotelephone communications system for the user terminal.

44. A user terminal according to claim 39 wherein the pages received at the second power level each comprise at least two voice mail indicator bits, wherein the at least two voice mail indicator bits are set according to a first pattern to indicate no reception of voice mail for the user terminal, according to a second pattern to indicate reception of one voice mail message for the user terminal, and according to a third pattern to indicate reception of two voice mail messages for the user terminal.

45. A method according to claim 21 wherein the steps of receiving voice mail and transmitting the page including the voice mail reception indicator are preceded by the step of:

transmitting a call set up page to the user terminal wherein the step of receiving voice mail occurs upon failure to receive an acknowledge of receipt of the call set up communication from the user terminal.

46. A radiotelephone communications system according to claim 27 further comprising:

means for transmitting a call set up page to the user terminal prior to receiving voice mail and prior to generating the page including the voice mail reception indicator; and wherein the means for receiving the voice mail for the user terminal receive the voice mail upon failure to receive an acknowledge of receipt of the call set up page.

* * * * *